United States Patent [19]
Lo et al.

[11] Patent Number: 5,835,794
[45] Date of Patent: Nov. 10, 1998

[54] ELECTRONIC FLASH MODULE

[76] Inventors: Allen Kwok Wah Lo, 5022 Hidden Branches Dr., Dunwoody, Ga. 30338; Kenneth Quochuy Lao, 650 Glen Ave., Westfield, N.J. 07090

[21] Appl. No.: 958,613

[22] Filed: Oct. 27, 1997

[51] Int. Cl.$^6$ .................................................... G03B 15/03
[52] U.S. Cl. .............................. 396/4; 396/157; 396/171; 396/182; 362/4; 362/11
[58] Field of Search ................................. 396/4, 157, 171, 396/182, 199, 159; 362/4, 11, 7, 8, 3

[56] References Cited

U.S. PATENT DOCUMENTS

| | | | |
|---|---|---|---|
| 4,298,907 | 11/1981 | Holt, Jr. ......................................... | 362/4 |
| 4,368,966 | 1/1983 | Hagyuda ................................... | 396/171 |
| 4,626,093 | 12/1986 | Matsui et al. ........................ | 396/159 X |
| 5,592,257 | 1/1997 | Sakamoto et al. ....................... | 396/171 |

*Primary Examiner*—W. B. Perkey
*Attorney, Agent, or Firm*—Kenneth Q. Lao

[57] ABSTRACT

The disclosure is concerned with an electronic flash module comprising a plurality of flash subunits to illuminate a photographed scene in flash photography. Each flash subunit comprises a flash-tube and associated charging and triggering circuits; a modeling lamp to allow a photographer to set up the lighting pattern. Each module comprises a trip circuit to synchronously trip all the triggering circuits in the module. It is preferred that the module further comprises a photosensor to activate the trip circuit upon sensing a trigger pulse sent out by a remote device. Preferably, the module comprises connection means so that two or more modules can be linked up to form a panel with a larger illuminating source area. Furthermore, it is preferred that the flash subunits can be selectively and individually disabled to allow the photographer to adjust the illuminating pattern.

8 Claims, 3 Drawing Sheets

5,835,794

ELECTRONIC FLASH MODULE

BACKGROUND OF THE INVENTION

Electronic flashes are routinely used in a studio to illuminate a photographed scene. Presently electronic flashes are operated as individual units. When individual flashes are used to illuminate a photographed scene, they usually cause hot-spots or over-concentrated illumination on the illuminated object. Even though some flash units come with two flash tubes pointing at different directions to help diverting the light beams, they are effectively point-sources in that all the illuminating light rays originated substantially from a small source area. In order to reduce hot spots, photographers usually use umbrella-type reflectors and diffusing light boxes to extend the illuminating source area. Alternatively, a plurality of individual flashes are placed at different locations and optically linked via photosensors on the flash units to sense a trigger signal so that all the flashes can be synchronously activated. These methods for extending the illuminating source area are expensive and cumbersome.

It is advantageous to provide an inexpensive and convenient way to extend the illuminating source area and means to achieve a less concentrated illuminating pattern.

SUMMARY OF THE INVENTION

It is an objective of the present invention to provide an inexpensive light source with a less concentrated illuminating pattern in flash photography.

It is another objective of the present invention to provide a simple means to link together two or more such light sources to further extend the illuminating source area.

The above objectives can be achieved by using electronic flash modules to illuminate the photographed scene. The flash module, according to the present invention, comprises a plurality of flash units distributed over a panel. Each module can be physically connected to other modules to further extend the illuminating source area.

On the electronic flash module, each flash unit is energized by a separate charging circuit and triggered by a separate high-voltage pulse circuit. Preferably, each module has a battery or a power source to supply power to all the flash units within the module. Alternatively, each flash unit has a separate battery or power source. All the high-voltage pulse circuits in the module can be tripped by a common trip circuit. Preferably, the trip circuit on each module is equipped with a photosensor to sense the trigger signal from a remote device for synchronously triggering all the flash units within the module. The trigger signal is usually sent out in the form of infrared pulses or the flash light from a "master" flash-tube when the shutter of a camera is released to expose the film. It is useful to have an on/off switch for each flash unit so that the flash units can be selectively disabled to avoid being activated when it is desirable to alter the illuminating pattern. It is also desirable to have a modeling lamp or light source to be located near and associated with each flash unit. These modeling lamps are useful for the photographer to set up the lighting pattern on the photographed scene. Each module may further comprise one or more batteries to supply power to these modeling lamps. All the modeling lamps in a module can be turned on and off together with a common switch. However, a modeling lamp will be disabled if the associated flash unit is disabled. Moreover, it is useful that the common switch on one module be electrically connected to the common switch on another module to allow the photographer to turn on all the modeling lamps on the electrically connected modules by using only one common switch.

The objectives and the scope of the present invention will become apparent upon reading the description of the drawing figures.

DETAILED DESCRIPTION OF THE INVENTION

Figure 1:
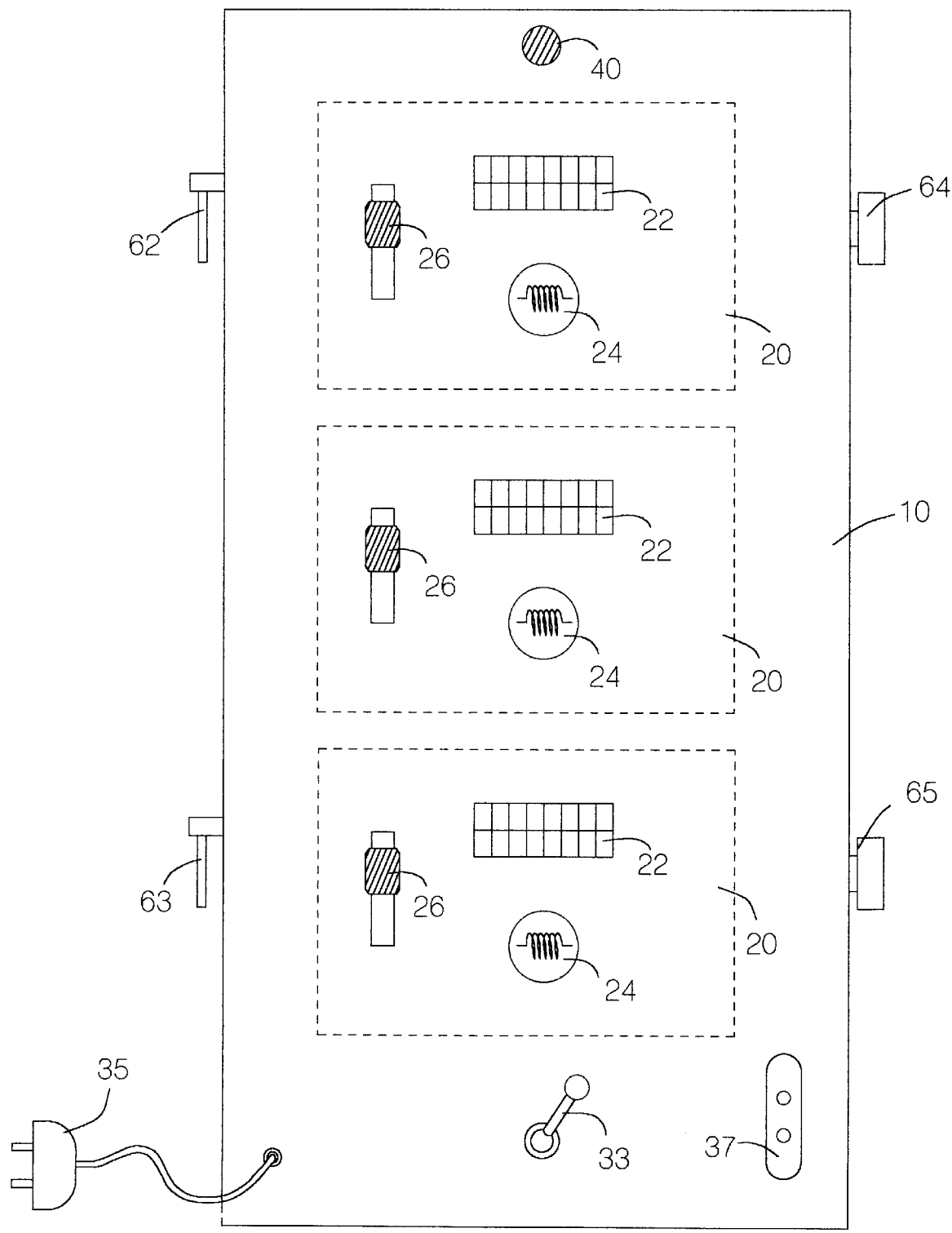
FIG. 1 illustrates the electronic flash module, according to the preferred embodiment of the present invention.

FIG. 1 illustrates the electronic flash module, according to the preferred embodiment of the present invention. As shown in FIG. 1, numeral 10 denotes an electronic flash module which comprises three flash subunits 20. Each subunit comprises a flash-tube 22, a modeling lamp 24 and a switch 26 for disabling the flash-tube and the modeling lamp in the same subunit, if so desired. All the modeling lamps on the module, when not disabled by switch 26, can be simultaneously turned on by a common switch 33. Preferably, the module 10 comprises connection means, such as pins 62 and 63 and matching retainers 64 and 65, to allow two or more modules to be linked together to form a flash panel with a larger illuminating source area. It is preferred that the module 10 comprises a receptacle 37 and a plug 35, both of which are connected to the common switch 33. The plug on one module can be plugged into the receptacle on another module so that the modeling lamps on all the electrically connected modules can be turned on by the action of any one switch 33. It should be noted that the receptacle 37 and plug 35 can also be incorporated into the connection means if so desired. That is, the common switch on one module can be electrically connected to the common switch on another module through the connection means.

It should be noted that FIG. 1 shows three flash subunits arranged in a straight row in one electronic flash module. But the number of flash subunits in a module can be two to twenty or more, and they can be arranged in any patterns. Also, the flash-tube 22 in each subunit may be movably mounted so it can be tilted to different directions for changing the illumination pattern.

Figure 2:
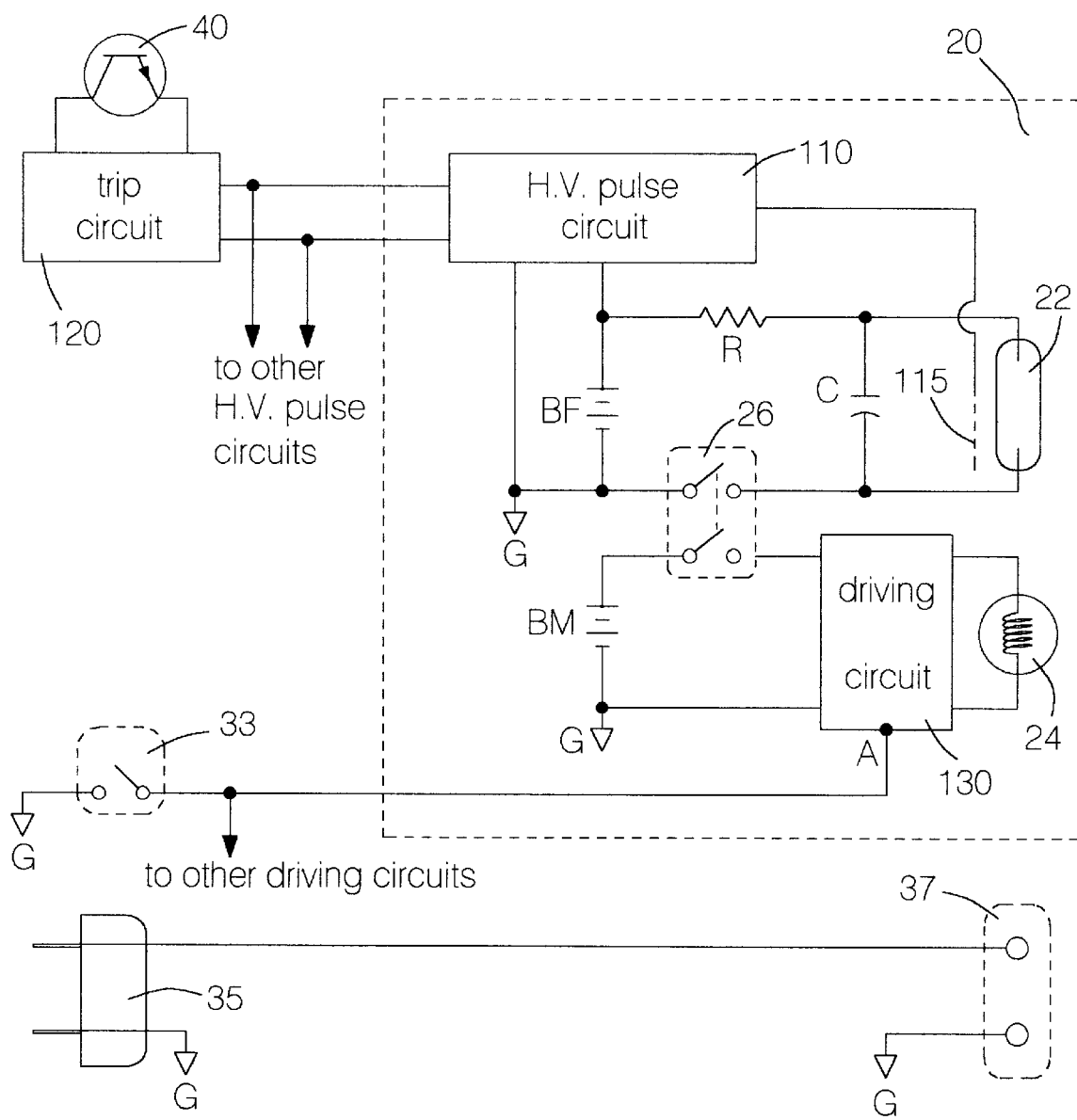
FIG. 2 shows the typical circuits for activating a flash-tube and driving the modeling lamp.

FIG. 2 shows the typical circuits for activating the flash-tube and driving the modeling lamp within one flash subunit in an electronic flash module. For illustrative purposes only, within a flash subunit 20, a flash tube 22 is energized by a battery BF through a charging circuit comprising a resistor R and an energy-storing capacitor C. A high-voltage pulse circuit 110 is used to generate high voltage pulses to trigger the discharge in the flash-tube 22 via a trigger electrode 115. The high-voltage pulse circuit is activated by a trip circuit 120 when the photosensor 40 senses a trigger signal from a remote device. The high-voltage pulse circuit can also be activated for testing by a manual switch which is not shown. The flash-tubes on each module can be selectively and separately disabled by a switch 26 in each flash subunit 20. This selective disabling of flash-tubes allows a photographer to alter the illumination pattern on the photographed scene. The trip circuit 120 is also connected to the high-voltage pulse circuit in other flash subunits within a module for synchronously triggering all the flash tubes within the module. The modeling lamp 24, powered by a battery BM in the flash subunit 20, is controlled by a driving circuit 130. It is preferred that a common switch 33 is used to turn on and off all the modeling lamps 24 on the module. For illustrative purposes only, the modeling lamps can be turned on by connecting point A of the driving circuit to ground, denoted by letter G. However, as with the flash-tube, the modeling lamp can also be disabled by the switch 26. As shown in FIG. 2, the common switch 33 is connected to the receptacle 37 and the plug 35.

Figure 3:
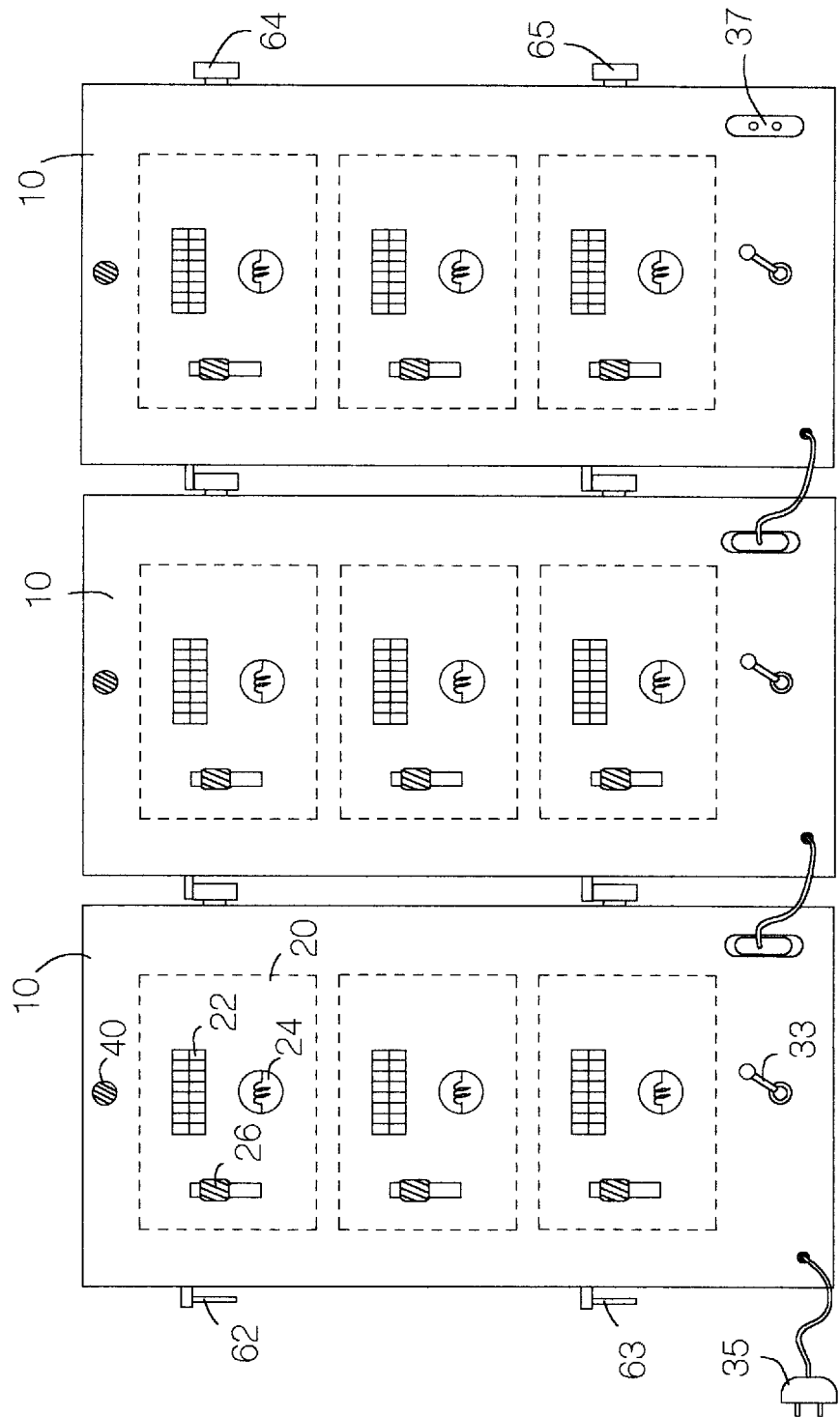
FIG. 3 illustrates a number of flash modules being linked together to provide a larger illuminating source area.

FIG. 3 illustrates a number of flash modules being linked together to form a flash panel with a larger illuminating source area. As shown, three electronic flash modules 10 are connected side-by-side to make a wider panel consisting of nine flash subunits. With additional connection means, the modules can also be linked together to make a panel with greater height. Furthermore, it is preferred that the connection between modules being made flexible so that a panel of physically connected modules can be bent into different shapes to achieve a better distribution of light over a photographed scene. For example, a series of connected modules can be made into a semicircle around a photographed object. But modules can also be used to synchronously illuminate a photographed scene without being physically or electrically connected together.

While the present invention has been disclosed in reference to the preferred embodiment, it shall be understood by those skilled in the art that various changes, modifications and substitutions may be incorporated into such embodiments without departing from the spirit of the invention as defined by the claims appearing hereafter.

What is claimed is:

1. An electronic flash module comprising a plurality of flash subunits distributed over an area and capable of being synchronously activated to produce a short light pulse for providing a distributed illuminating pattern over a photographed scene; said flash module further comprising mechanical connecting means to allow said flash module to be physically linked with at least one other flash module to form a flash panel which is capable of being bent into different shapes and capable of being placed in any desirable location in relation to the photographed scene.

2. The flash module of claim 1 wherein each of said flash subunit comprises a flash-tube, means for energizing said flash-tube and means for triggering said flash-tube.

3. The flash module of claim 1 further comprising at least one power source to provide power to said flash subunits.

4. The flash module of claim 1 further comprising means for synchronously tripping said triggering means in said flash subunits.

5. The flash module of claim 4 further comprising a photosensor means to activate said tripping means upon sensing a trigger pulse sent out by a remote device.

6. The electronic flash module of claim 1 further having a plurality of modeling light sources each associated with one flash subunit; said modeling light sources being used for testing the distributed illumination provided by said flash module.

7. The electronic flash module of claim 1 wherein each of said flash subunits is capable of being selectively and individually disabled for altering the distributed illumination provided by said flash module.

8. The electronic flash module of claim 2 wherein the flash-tube is movably mounted.

* * * * *